Nov. 16, 1926.
W. S. SPEED
1,606,850
METHOD OF AND APPARATUS FOR UTILIZING HEAT FROM CEMENT CLINKERS
Filed March 23, 1920
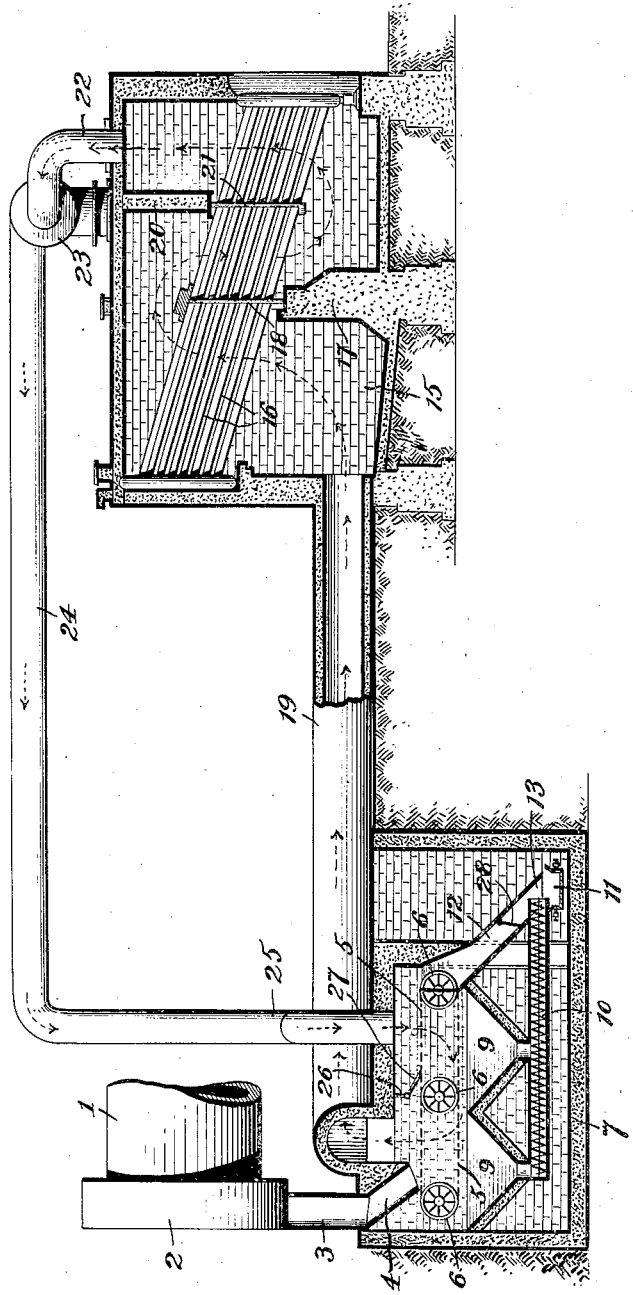
Witness:
Jas E S Hutchinson
Inventor:
Wm. S. Speed,
By Milans & Milans
Attorneys:

Patented Nov. 16, 1926.

1,606,850

UNITED STATES PATENT OFFICE.

WILLIAM S. SPEED, OF LOUISVILLE, KENTUCKY, ASSIGNOR TO LOUISVILLE CEMENT COMPANY, OF LOUISVILLE, KENTUCKY.

METHOD OF AND APPARATUS FOR UTILIZING HEAT FROM CEMENT CLINKERS.

Application filed March 23, 1920. Serial No. 368,110.

This invention relates to the process of, and apparatus for cooling cement clinker and the like and utilizing the contained heat therein.

It is a matter of common knowledge that the clinker discharged from Portland cement kilns and the like is in a red hot condition, and it has been the practice, so far as I know, not to make use of this latent heat for the purpose of generating steam, and it is the primary object of the present invention to provide a method, and novel means, for simultaneously exerting a cooling influence on the clinker and at the same time retaining and utilizing the heat from the clinkers for the purpose of generating steam.

In carrying out the invention, it is proposed to pass air, preferably by force, over and through the clinker, whereby to cool the latter and whereby to heat the air to approximately the temperature of the clinker, and means whereby this air is conducted directly to a boiler, conveniently of the waste heat type, where steam will be generated by the hot air.

It is a further object of the invention to provide means whereby the air used in the steam generation after leaving the boiler may be returned to be again passed over and through the clinker, thus maintaining a complete cycle for the air.

It is a further object of the invention to provide in operative association with the kiln, such as the rotary Portland cement kiln, means to receive the discharged clinker from the kiln, and novel means for circulating air with respect to said clinker, and means for conveying said air for steam generating purposes.

Other improvements and novel details in the construction and arrangement of parts will be appreciated from the description to follow, which for a clear understanding of the invention is to be considered in connection with the accompanying drawings which form a part hereof, and wherein is disclosed for the purposes of illustration a convenient and satisfactory embodiment of an apparatus useful in carrying out the invention.

In the drawings, Fig. 1 is a view in part elevation and part section.

With more particular reference to the drawings, 1 is a rotary kiln broken away so as to disclose only the lower discharge end thereof, which connects with a suitable hood 2 having a discharge opening at the base thereof and connecting with a discharge chute 3 having an offset incline lower end 4, which lower end is open whereby the clinker may be delivered directly upon a support which takes the form of an endless chain grate 5 mounted upon suitable rollers 6. One of the end rollers 6 may have applied thereto suitable means, not shown, for the purpose of imparting movement to the grate.

A suitable enclosing housing or casing 7 is provided for forming therewithin a chamber for the discharge end of the chute 3, the chain grate, and associated parts.

Positioned within the housing 7 below the chain grate are suitable hoppers 9 adapted to receive any clinker dust, etc., from the grate, said hoppers having an opening at the lower end thereof adapted to discharge any collected dust onto a suitable conveyor, which may take the form of a screw or the like 10, adapted to feed the dust to the discharge end of the casing surrounding the screw and deliver the same to a pan conveyor or the like 11 arranged transversely with respect to the spiral conveyor and percolating to the outside of the casing or housing 7. Connecting with the discharge end of the grate, is a suitable spout 12 adapted to discharge the clinker into the pan conveyor as indicated at 13. 15 represents generally a boiler, preferably of the waste heat type, having the usual horizontally-inclined water tubes 16 and baffle members 17 and 18. Connecting with the boiler adjacent the base thereof and at a point below the upper end of the inclined tubes is an insulated flue, the conduit 19 extending horizontally and communicating at its opposite end with the chamber above the chain grate and at a point adjacent the discharge end of the clinker chute 3.

Leading from the top of the boiler at a point above the lower end of the inclined tube 16 and at a point outside of the baffles 20 and 21 is an air conduit 22, preferably of less diameter than the pipe 19, the conduit 22 being conveniently L-shaped and connecting with the side of the casing 23 of a fan blower of any of the approved types, which casing in turn connects at its periphery with a horizontally-extending flue or conduit 24 of substantially the same diameter and constituting in effect a continuation of the conduit 22, the conduit 24 having a downwardly-projecting opposite end 25 leading through the top of the housing 7 and in open communication with the chamber above the clinker grate adjacent the discharge end of the latter. Arranged within the chamber of the housing 7 above the chain grate is a vertical partition 26 depending from the top of the housing and terminating at a point above the grate and connecting with a hinged section 27, the lower end of which latter is adapted to drag upon the clinker of the grate.

The hinged member 28 may also be positioned within the spout 12, the lower free end of which is adapted to drag upon the clinker in such spout and form with the clinker a substantial closure against air. Likewise the clinker, as discharged from the chute 3, will preferably be of a depth whereby with the clinker on the grate to form a substantial closure against the admission of air.

In operation, the clinker in a red hot condition is discharged from the lower end of the rotary kiln and falls upon the forward end of the chain grate 5, or other suitable form of stoker. The clinker is carried gradually back by means of the grate, means being employed to rotate the sprocket wheels for a grate chain, and the clinker will be discharged at the rear end of the grate through the spout 12 onto the pan conveyor 11. Any clinker or dust discharging through the grate will fall into the hoppers 9, from whence to be discharged into the pan conveyor 11 by means of the spiral conveyor 10.

The rotary air pump within the casing 23 is thereupon operated, which serves to pass the air backwards and forwards through the clinker grate, in the direction of the arrows, thus cooling the clinker and heating the air whereby it assumes approximately the temperature of the clinker at the point of discharge from the kiln. The air is then carried through the insulated conduit 19 to the boilers whence it is deflected by the baffles 17 and 18 to pass over the upper ends of the boiler tube, and thence downwardly to the opposite side of said baffles, beneath the baffles 20 and 21, thence over the lower end of the boiler tubes and upwardly into communication with the conduit 22, which connects with the air fan or pump. It will therefore be observed that the air as it passes from the boiler instead of escaping to the atmosphere is returned through the conduit 24 and extension 25 to the clinker grate, and once more pass through the clinker, thus retaining the heat in the air. As illustrated, the incoming air should be admitted near a point at the discharge end of the clinker grate, where the clinker is the coolest, after which it passes backwards and forwards through the grate and discharges into the boiler, feeding the conduit at a point adjacent the incoming clinker, with the result that the air will be gradually heated to approximately the heat of the incoming clinker.

It has been ascertained that by the use of this process, the discharged clinker will be in a materially cold condition, whereas the latent heat in the clinker as fed to and along with the grate will impart to the air circulating over and through the clinker a high degree of temperature sufficient for the efficient generation of steam, and therefore a novel and useful result is accomplished in utilizing the latent clinker, which heretofore has gone to waste.

What I claim as new and desire to secure by Letters Patent of the United States, is—

1. The improved process of utilizing latent heat in clinker, which consists in introducing the clinker from a rotary kiln or the like into a confined chamber causing air to travel back and forth through the clinker, in a direction counter to the direction of the movement of the clinker, and thence through a closed conduit to a point to be used as a heating medium.

2. The improved process of utilizing the heat from Portland cement clinker and the like, which consists in directly discharging the clinker from a kiln into a confined chamber, causing the clinker to move along said chamber, and simultaneously causing air to pass back and forth through the clinker, in a direction counter to the direction of the movement of the clinker, causing the heated air to be discharged into a closed conduit.

3. The improved process of utilizing the heat from portland cement clinker and the like, which consists in directly discharging the clinker from a kiln into a confined chamber, causing the clinker to move along said chamber, and simultaneously causing air to pass back and forth through the clinker, causing the air to be discharged into a closed conduit at a point adjacent the point of delivery of the clinker to said chamber.

4. The improved method of utilizing heat of clinker discharged from cement kilns, which comprises delivering the hot clinker from the kiln directly onto a movable open platform arranged within an enclosing casing, causing air to be introduced above the platform adjacent the rear end thereof and to pass downwardly through the clinker and to thereafter pass upwardly through the clinker adjacent the forward end of the platform, at which point the clinker is hottest, causing the air at this point to be discharged and fed through a closed conduit, causing the air as delivered from the conduit to be confined and pass to a point to be used as a heating medium.

5. The improved process of utilizing the heat of clinker from Portland cement kilns and the like, which consists in passing the heated clinker while at a very high temperature, through a chamber while supported on an open support, passing air backwards and forwards through the support, in a direction counter to the direction of the movement of the clinker, whereby to cool the clinker, and causing the air when heated to approximately the temperature of the clinker to be delivered through a closed conduit to a point to be used as a heating medium.

6. The improved process of treating clinker to cool the same, which consists in discharging the clinker from a Portland cement kiln or the like directly onto a traveling grate arranged within a confined chamber, and causing air to be introduced into the chamber adjacent the discharge end of the grate, causing the air to pass through the grate at the cooler end thereof, and to again pass through the grate in an opposite direction adjacent the hotter end thereof, and causing the air to be discharged from the said chamber.

7. The improved process of treating clinker to cool the same, which consists in discharging the clinker from a Portland cement kiln or the like directly onto a traveling grate arranged within a confined chamber, and causing the air to be introduced into the chamber adjacent the discharge end of the grate, causing the air to pass through the grate at the cooler end thereof and to again pass through the grate in an opposite direction adjacent the hotter end thereof, confining the air as discharged from the chamber, and delivering the same while in a highly heated condition to a point to be used as a heating medium.

8. The improved process of utilizing the heat of clinker as delivered from Portland cement kilns and the like, which consists in discharging the clinker directly from the kiln onto a traveling platform, introducing the air under forced draft into a confined chamber surrounding the platform, causing the air to pass back and forth through the clinker on the platform whereby to cool the clinker, and causing said air to be discharged from the chamber at a point adjacent the hottest point of the clinker bed on the platform.

9. In an apparatus for treating Portland cement clinker and the like, the combination of a traveling platform, an enclosing casing therefor, a rotary kiln, a chute leading from the kiln adapted to discharge the hot clinkers directly onto the platform adjacent the forward end thereof, means for introducing air adjacent the rear end of the platform chamber, means within the chamber for deflecting the air, whereby the same is caused to pass back and forth through the clinker, and an outlet for said air adjacent the forward or hotter end of the clinker on the platform.

10. In an apparatus of the character described, the combination of an enclosing casing, a horizontally-disposed traveling grate within said casing, a hopper disposed below the grate, a horizontally-disposed conveyor below the hopper, an auxiliary conveyor into which the horizontally-disposed conveyor discharges, a discharge chute adjacent the rear end of the traveling grate to discharge onto the auxiliary conveyor, an air inlet pipe and an air outlet pipe communicating with the chamber formed by said casing adjacent opposite ends thereof, and a feed chute adapted to be connected to a rotary kiln and projecting through the casing whereby to discharge clinker directly onto said platform adjacent the forward end thereof.

11. In an apparatus of the character described, the combination of an enclosing casing, a horizontally-disposed traveling grate within said casing, a hopper disposed below the grate, a horizontally-disposed conveyor below the hopper, an auxiliary conveyor into which the horizontally-disposed conveyor discharges, a discharge chute adjacent the rear end of the traveling grate to discharge onto the auxiliary conveyor, an air inlet pipe and an air outlet pipe communicating with the chamber formed by said casing adjacent opposite ends thereof, and means forming a baffle whereby to cause air as fed into the chamber through the inlet pipes to pass through the clinker and grate prior to its discharge through the outlet pipe, and a feed chute adapted to be connected to a rotary kiln and projecting through the casing whereby to discharge clinker directly onto said platform adjacent the forward end thereof.

12. In an apparatus of the character described, the combination of an enclosing casing, a horizontally-disposed traveling grate within said casing, a hopper disposed below the grate, a horizontally-disposed conveyor below the hopper, an auxiliary conveyor into which the horizontally-disposed conveyor discharges, a discharge chute adjacent the rear end of the traveling grate to discharge onto the auxiliary conveyor, an air inlet pipe and an air outlet pipe communicating with the chamber formed by said casing adjacent opposite ends thereof, means forming a baffle whereby to cause air as fed into the chamber through the inlet pipes to pass through the clinker and grate prior to its discharge through the outlet pipe, a feed chute adapted to be connected to a rotary kiln and projecting through the casing whereby to discharge clinker directly onto said platform adjacent the forward end thereof, and a rotatable fan in the air inlet pipe.

13. In an apparatus for treating clinkers or the like, the combination of a casing, a traveling platform mounted in the casing, means for discharging hot clinkers on to the platform, a deflector hingedly connected to the top of the casing with its lower end resting on the top of the traveling platform, means for introducing air adjacent the rear end of the platform, the hinged deflector causing the air to first pass downwardly through the clinkers and platform and then upwardly therethrough, and means for conveying the heated air from the platform casing to a point to be used as a heating medium.

In testimony whereof I have hereunto affixed my signature.

WILLIAM S. SPEED.